No. 735,465. PATENTED AUG. 4, 1903.
J. R. CARTER.
GEARING.
APPLICATION FILED OCT. 3, 1902.
NO MODEL. 2 SHEETS—SHEET 1.
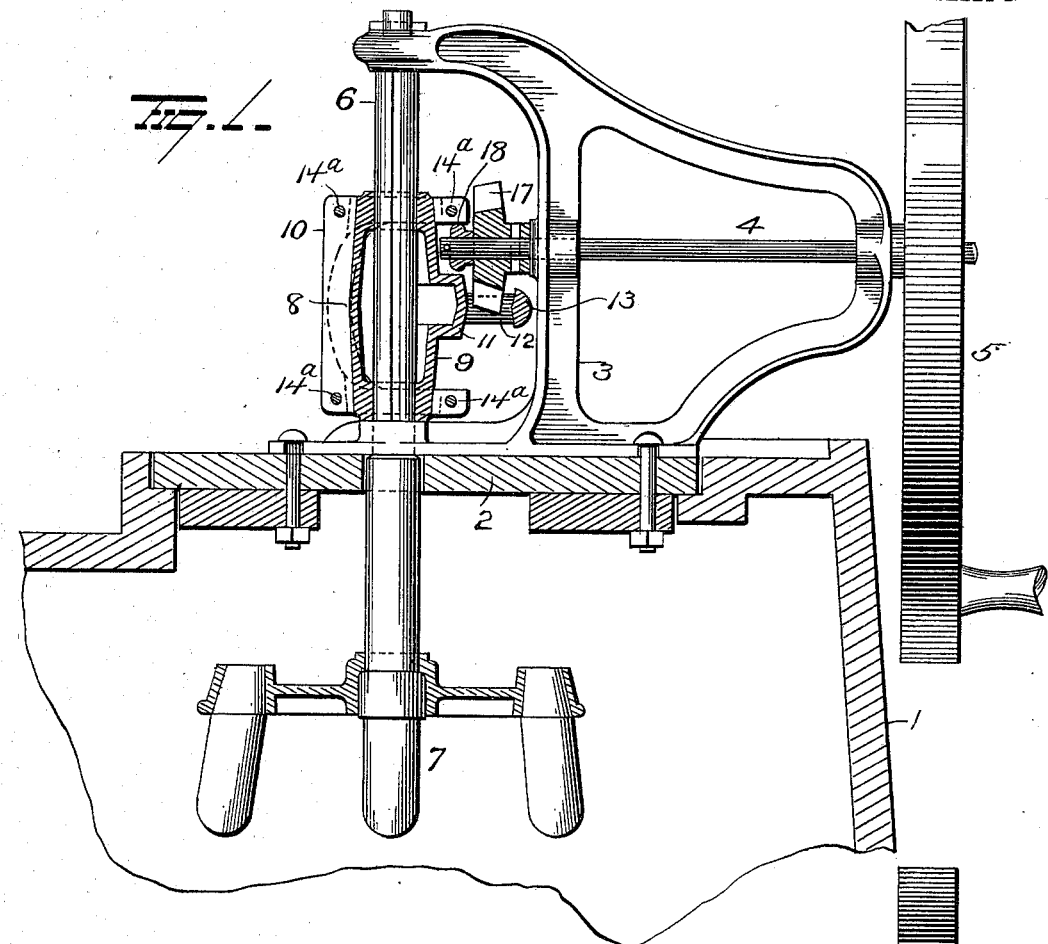
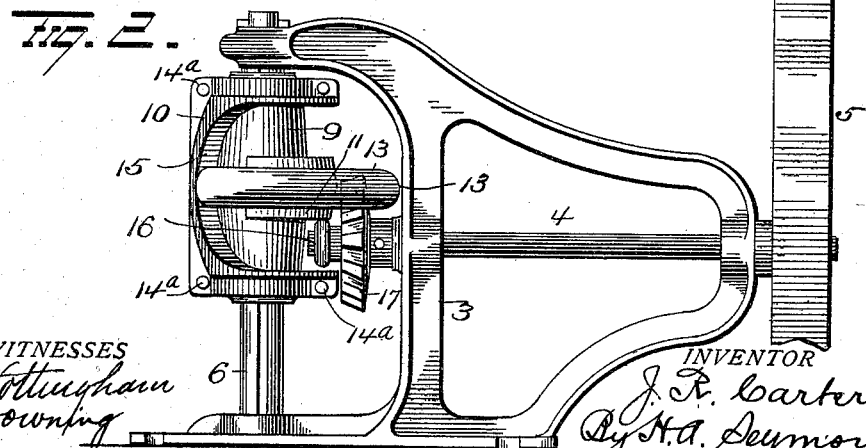
WITNESSES
E. J. Nottingham
G. F. Downing
INVENTOR
J. R. Carter
By H. A. Seymour
Attorney No. 735,465. PATENTED AUG. 4, 1903.
J. R. CARTER.
GEARING.
APPLICATION FILED OCT. 3, 1902.
NO MODEL. 2 SHEETS—SHEET 2.
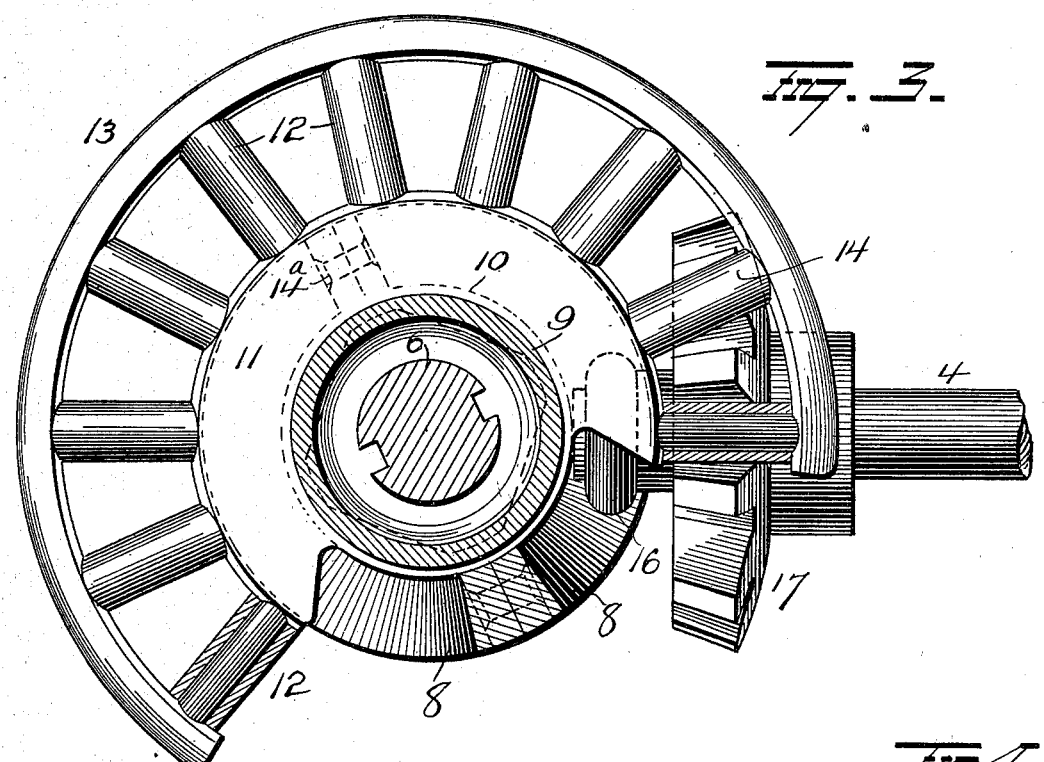
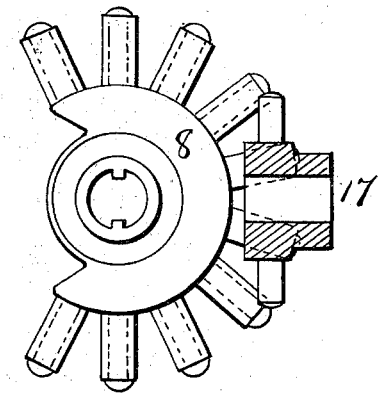
WITNESSES
E. Nottingham
G. F. Downing.
INVENTOR
J. R. Carter
By H. A. Seymour
Attorney No. 735,465. Patented August 4, 1903.

UNITED STATES PATENT OFFICE.

JOHN R. CARTER, OF AUGUSTA, KENTUCKY, ASSIGNOR TO ERNST H. HUENEFELD, OF CINCINNATI, OHIO.

GEARING.

SPECIFICATION forming part of Letters Patent No. 735,465, dated August 4, 1903.

Application filed October 3, 1902. Serial No. 125,820. (No model.)

*To all whom it may concern:*

Be it known that I, JOHN R. CARTER, a resident of Augusta, in the county of Bracken and State of Kentucky, have invented certain new and useful Improvements in Gearing; and I do hereby declare the following to be a full, clear, and exact description of the invention, such as will enable others skilled in the art to which it appertains to make and use the same.

My invention relates to an improved gearing, and more particularly to an improved alternating rotary gearing for washing-machines and the like, the object of the invention being to provide improvements of this character in which a driving-gear will alternately engage the upper and lower faces of the teeth of a rack or gear-segment and provide improved means for maintaining the gears in proper relative position to each other and minimize the friction of parts to insure an easy-running gearing.

With this object in view the invention consists in certain novel features of construction and combinations and arrangements of parts, as will be more fully hereinafter described, and pointed out in the claims.

In the accompanying drawings, Figure 1 is a view in elevation, partly in section, illustrating my improvements. Fig. 2 is a side view with the parts in different positions. Fig. 3 is a plan view. Fig. 4 is a top view of frame 10, and Fig. 5 is a view of a modification.

1 represents a washing-machine tub having a cover 2 hinged thereon, and on this cover a frame 3 is secured by bolts or screws, as shown. This frame supports the horizontal driving-shaft 4, having a hand-wheel 5 or other suitable means thereon for turning the shaft. The frame also supports a vertical driven shaft 6, which projects down through the cover and forms the dasher-rod on which the dasher 7, of any desired construction, is secured.

The shaft 6 is grooved in its opposite sides to receive feathers at the ends of my improved cylinder 8, which latter comprises the hub 9 and frame 10 clamped thereon. The hub 9 is preferably one integral hollow casting having circular bearings at each end to receive shaft 6 and made with a hollow semicircular extension 11 on one side of the hub at its center, and with this extension 11 a toothed segmental rack 12 is made integral. The segment 12 comprises a series of radially-disposed cylindrical teeth connected at their outer ends by band 13, and on the end teeth of the segments rotary cylinders 14 are supported to reduce friction, as will be hereinafter understood.

The outer circumference of the upper and lower ends of hub 9 are made angular and have clamped thereon the frame 10 above referred to, which comprises two approximately C-shaped semicylindrical castings secured together and clamped on the hub by means of bolts or rivets 14ª, as shown, and said frame forms a track or runway 15 for a roller 16, as will now be set forth.

On drive-shaft 4 a beveled pinion 17 is secured and has its teeth meshing with rack 12, and on the end of this shaft a roller 16 is mounted to revolve and run on the track 15 and against the lower face of extension 11 to support the cylinder and always maintain the pinion and rack in proper relative position, and thereby prevent binding and reduce friction of the parts.

The operation of my improvements is as follows: Drive-shaft 4 is continuously revolved in either direction, and pinion 17 thereon meshes with rack 12, and we will suppose for the purpose of explanation that the pinion is in engagement with the upper face of the rack. As the pinion revolves it will turn the cylinder to the end of the rack, the roller 16, running on track 15, supporting the cylinder and maintaining the rack in proper working position. When the pinion reaches the end or roller tooth, it will engage the same to raise the rack and cylinder, roller 16 running along the curved side portion of the track, and as the pinion elevates the rack above it roller 16 will move beneath extension 11 and support the cylinder in this elevated position, while the pinion turns it in the reverse direction. When the pinion reaches the other end or roller tooth, it will permit the cylinder to drop down and ride on top of the same, the roller 16 riding around on the opposite curved side of the track and up against the flat upper portion of the track, as at first. It will thus be seen that the pinion alternately engages the upper and lower faces of the rack to revolve the driven shaft in opposite directions, and that the roller 16, running along the track, serves to support the cylinder and always maintain the pinion and rack in proper relative position to reduce friction and prevent binding and undue wear of the parts.

I might, if desired, construct my improvements as shown in Fig. 5, in which I dispense with the connecting-band on the outer end of the rack-teeth and provide all of the teeth with rotary casings instead of the end teeth only, as illustrated in Fig. 3. The pinion is provided with straight teeth, and the teeth may or may not have rotary casings, as preferred.

A great many other changes might be made in the general form and arrangement of the parts described without departing from my invention, and hence I would have it understood that I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. The combination with a drive-shaft and a driven shaft arranged at right angles thereto, of a vertically-movable cylinder mounted on the driven shaft and provided at its upper end with an underrunning trackway, a rack having an underrunning trackway on the lower surface of its hub, a pinion on the drive-shaft adapted to mesh with the upper and lower faces of the teeth on the rack, and an antifriction-roller adapted to engage said underrunning trackways and support the cylinder and rack, substantially as set forth.

2. The combination with a driven shaft, a hollow hub keyed to slide thereon and having a semicircular extension on one side and made angular at its ends, of an approximately C-shaped semicylindrical split frame clamped around the angular ends and forming a track, a pinion on the drive-shaft to alternately engage the upper and lower faces of the rack and raise and lower the hub and frame, and a roller on the drive-shaft to run on said track and against the lower face of the extension to maintain the rack and pinion at all times in proper relative positions.

3. In a washing-machine, a vertically-disposed rubber-shaft, a spool carried thereby, the latter being provided with terminal circular heads and a peripheral rib connecting said heads and having concaved sides forming tracks or ways continuous with the inner adjacent faces of the heads, a segment disposed on the spool between the heads, rollers or teeth disposed radially along the periphery of the segment, a horizontally-disposed drive-shaft having a terminal roller adapted to traverse the concaved sides of the rib and the under surfaces of the upper head and segment, said roller occupying a position interior to the outer circle of the segment, and a pinion carried by the drive-shaft and meshing with the rollers on the segment, the parts operating substantially as, and for the purpose set forth.

In testimony whereof I have signed this specification in the presence of two subscribing witnesses.

JOHN R. CARTER.

Witnesses:
S. W. FOSTER,
A. W. BRIGHT.